United States Patent
Rodoper et al.

(10) Patent No.: US 9,730,009 B1
(45) Date of Patent: Aug. 8, 2017

(54) SPARSE WI-FI ACCESS POINT DATABASE FOR MOBILE DEVICES

(71) Applicant: Amazon Technologies, Inc., Reno, NV (US)

(72) Inventors: Mete Rodoper, Sunnyvale, CA (US); Arvind Thiagarajan, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/227,855

(22) Filed: Mar. 27, 2014

(51) Int. Cl.
*H04W 24/00* (2009.01)
*H04W 4/02* (2009.01)

(52) U.S. Cl.
CPC .................................... *H04W 4/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0176583 | A1* | 7/2008 | Brachet | G01S 5/0236 455/456.3 |
| 2009/0042587 | A1* | 2/2009 | Kamdar | H04W 68/06 455/458 |
| 2011/0235532 | A1* | 9/2011 | Alizadeh-Shabdiz | G01S 5/0278 370/252 |
| 2011/0275364 | A1* | 11/2011 | Austin | H04L 41/12 455/423 |
| 2011/0299422 | A1* | 12/2011 | Kim | H04W 48/16 370/253 |

* cited by examiner

*Primary Examiner* — Idowu O Osifade
(74) *Attorney, Agent, or Firm* — Weaver Austin Villenveuve & Sampson LLP

(57) ABSTRACT

An electronic device has a processor, a Wi-Fi radio, a first database and a second database. The first database includes geolocation and identity information of a sparse subset of a global catalog of Wi-Fi access points. The second database includes locally stored location-based content. The processor: (i) controls the Wi-Fi radio so as to detect one or more Wi-Fi access points proximate to the electronic device, (ii) makes an identification of the one or more detected Wi-Fi access points, (iii) makes a coarse determination of a location of the electronic device by comparing the identification of the one or more detected Wi-Fi access points with the geolocation identity information in the first database, (iv) selects location based content corresponding to the coarse determination from the second database or from a server, and (v) outputs the selected location-based content to a user of the electronic device.

15 Claims, 10 Drawing Sheets

```
                    300 ↘

┌─────────────────────────┐
          │ Detect one or more Wi-  │
          │    Fi access points     │
          │          310            │
          └─────────────────────────┘
                      │
                      ▼
      ┌──────────────────────────────────┐
      │ Obtain identifying information of│
      │   the detected WiFi access       │
      │            point(s)              │
      │              320                 │
      └──────────────────────────────────┘
                      │
                      ▼
      ┌──────────────────────────────────┐
      │  Compare identifying information │
      │  of detected Wi-Fi AP(s) with    │
      │  sparse database to determine    │
      │  location of detected Wi-Fi AP(s)│
      │              330                 │
      └──────────────────────────────────┘
             │              │
             │              │
             ▼              │
   ┌───────────────────┐    │
   │ Make a determination │ │
   │ of location of the   │ │
   │ electronic device    │ │
   │ relative to one or   │ │
   │ more of the detected │ │
   │ Wi-Fi APs            │ │
   │        335           │ │
   └───────────────────┘    │
             │              │
             └─────┐   ┌────┘
                   ▼   ▼
      ┌──────────────────────────────────┐
      │  Select location-based content   │
      │  appropriate to the determined   │
      │             location             │
      │              340                 │
      └──────────────────────────────────┘
                      │
                      ▼
      ┌──────────────────────────────────┐
      │   Output the selected location-  │
      │          based content           │
      │              350                 │
      └──────────────────────────────────┘
```

*FIG. 3*

SPARSE WI-FI ACCESS POINT DATABASE FOR MOBILE DEVICES

BACKGROUND

Location-based services have become common functions of mobile devices such as smart phones, tablets, E-readers and similar personal electronic devices. Such functions may be enabled by way of a global positioning system (GPS) receiver, cell phone tower triangulation, and/or Wi-Fi positioning techniques. Known Wi-Fi positioning techniques rely on accessing a backend server (the "location server"), that catalogs identifying information and locations of a very large number of wireless network access points in a location server database. Known location server databases include the latitude, longitude, network name (service set identification or SSID), signal strength and media access control (MAC) address of some hundreds of millions of Wi-Fi access points (AP's). According to known Wi-Fi positioning techniques, when an app on a client mobile device is required to know the mobile device's geographic location, identifying information and signal strength of one or more Wi-Fi access points within range of the mobile device is sent to the location server. The location server uses this information, together with information in the location server database, to compute an estimate of the mobile device's location and return the estimate to the client mobile device. The estimate may be accurate to a few tens of meters. A number of popular mobile devices are Wi-Fi only devices, by which is meant that the devices omit the cost and overhead of a GPS receiver and are not enabled to operate with cellular networks (either as a result of the mobile device's design, or a choice of a user who prefers not to pay an additional fee to "activate" the device onto a cellular service provider's network). As a result, the only option for location-based services on such devices is to use Wi-Fi positioning.

BRIEF DESCRIPTION OF DRAWINGS

FIG. 3 is a simplified process flow diagram of a method for providing location based services and advertising to a user of the electronic device, according to an implementation.

DETAILED DESCRIPTION

Figure 1:
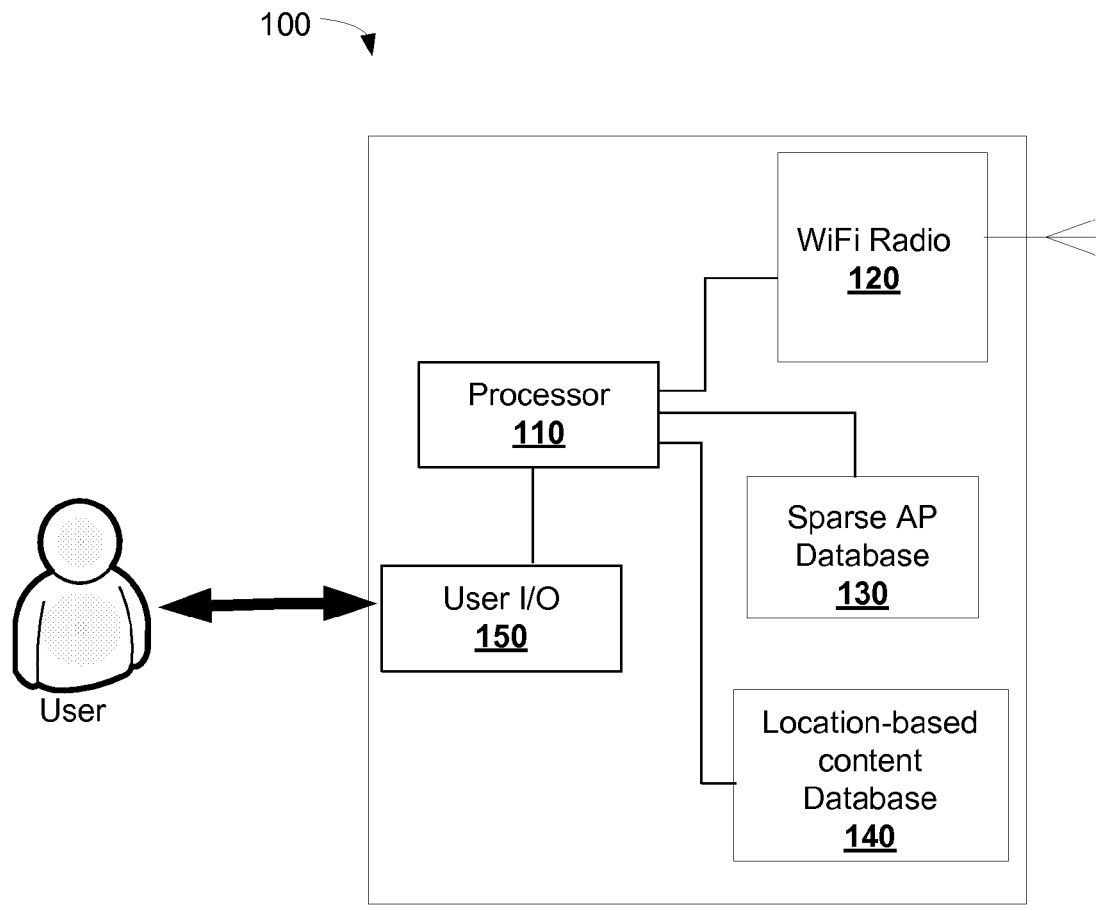
FIG. 1 is a simplified block diagram of an electronic device configured according to a particular class of implementations.

The presently disclosed techniques relate to enabling delivery of location-based content on a mobile device even in the absence of an active Internet connection, whether or not the mobile device includes a GPS receiver or is operable with a cellular network. Delivery of location-based content refers to outputting, to a user of the mobile device, information that is tailored to the physical location of the mobile device. As a few examples, location-based content may include customized information, based on the physical location of the mobile device, related to the location of nearby businesses or government services, tourist attractions, local weather, traffic, news and advertisements. As contemplated by the present disclosure, the mobile device may make a coarse determination of its location by comparing received Wi-Fi access point ("AP") identification information with a locally stored sparse database of AP geo-coordinates. Based on the coarse location determination, a location-appropriate selection of location-based content that may be locally stored on the mobile device may be output to a user of the mobile device.

As described above, provision of location-based content requires knowledge of the mobile device's (at least approximate) geographic location. When the mobile device has a connection with the Internet, a location estimate accurate to within a few tens of meters may be obtained from a back end server (the "location server"). The presently disclosed techniques relate to estimating the location of the mobile device without necessarily accessing the location server. As a result, location-based content may be provided on the mobile device even in the absence of an Internet connection. Moreover, even when the mobile device is connected with the Internet, the presently disclosed techniques may, advantageously, avoid the latency and compromise of user privacy associated with querying, and waiting for a response from, the location server.

In some implementations, a sparse access point ("AP") database is stored on the device. The sparse AP database may only include identifying information and location information of a selected subset of the APs catalogued by the location server database.

In some implementations, for example, the locations where Wi-Fi devices are used most often may be identified. Such a location, referred to hereinbelow and in the claims, as a "point of interest" or "PoI" may be a destination or landmark where Wi-Fi devices are most likely to be clustered. For example, PoI's may include transportation hubs, shopping centers, museums, libraries and cultural centers, government buildings, sports complexes, parks, scenic places, cafes, restaurants, hotels, etc. The sparse AP database may be populated by first identifying a list of such PoI's, each PoI having a respective known location, and at least one nearby AP. In some implementations, a number of AP's, each AP being near the center of a respective PoI, may initially be selected and then other AP's may be selected that are 50-100 meter separate from each other and from the initially selected AP's.

The sparse AP database may be extracted from an existing location server database and may represent, for example, less than 1% of the total number of APs catalogued by the location database for any given geographic area. As a result, the presently contemplated techniques enable a reasonably sized, locally stored, database of AP's distributed across a broad geographic region. For example, the sparse database may relate to a geographic area equivalent to an entire metropolitan area, a county, a state, or an entire country. The number and geographic location of selected AP's may be determined so as to meet one or several coverage criteria. For example, the criteria may be to provide a 90-95% coverage of the entire geographic region or population. As a further example, the criteria may be to provide 99% coverage of urban regions, 50% coverage of suburban regions, and 10% coverage of rural or undeveloped regions. As a further example, the criteria may be to provide the best coverage (e.g., in terms of population density or geography) for a fixed number of AP's. As a yet further example, the criteria may include an objective of providing coverage to transportation corridors.

Referring now to FIG. 1, a simplified block diagram of a mobile electronic device in accordance with some implementations is illustrated. The electronic device 100, which may be a tablet, E-reader, or other personal electronic device (PED) for example, includes a processor 110, communicatively coupled with a Wi-Fi radio 120. In some implementations, the electronic device 100 may have no other wireless communication capability other than that provided by the Wi-Fi radio 120. The electronic device 100 may include a user input/output (I/O) interface 150, including, for example, a display screen (which may be a touchscreen, for example) and/or a keyboard, control buttons and the like. In the illustrated implementation, electronic device 100 also includes a sparse AP database 130 and a location-based content database 140.

The sparse AP database 130 stored on the electronic device 100 may include identifying information and location information of a subset of a larger list of known APs included in one or more location server databases.

In some implementations, the sparse AP database 130 may be a subset of the location server database that is selected in the following manner. The selected subset may be derived by first identifying PoI's where Wi-Fi devices are used most often. Such PoI's may include transportation hubs, shopping centers, museums, libraries and cultural centers, government buildings, sports complexes, parks, scenic places, cafes, restaurants, hotels, etc. Each PoI may have a respective known geo-coordinate and at least one nearby AP. In some implementations, an AP near the center of each respective PoI may initially be selected and then other AP's may be selected that are 50-100 meter separate from each other and from the initially selected AP's.

In some implementations, the sparse AP database 130 may be loaded onto electronic device 100 by the manufacturer or distributor of the electronic device 100. Alternatively, or in addition, part or all of the sparse AP database 130 may be downloaded onto the electronic device 100 at such time(s) when the electronic device 100 is connected to the Internet. Likewise, the sparse AP database 130 may be updated from time to time when the electronic device 100 is connected to the Internet.

It is contemplated that the sparse AP database 130 may relate to a large geographic region that is no smaller than, for example, a typical metropolitan region of 10 square miles or greater. As a result, a user of the electronic device 100 loaded with a particular sparse AP database 130 may travel extensively without a need to update or replace the database. In some implementations, the sparse AP database 130 may relate to a geographic region as large as a state, country, continent, or the world, for example.

It will be appreciated that the term "sparse", as used herein and in the claims, means that the AP database 130 includes a relatively small subset of a global catalog of known APs. Thus the AP database 130 represents a "sparse subset" of AP's that may include substantially less than one hundred percent of known APs in the particular geographic region to which the AP database 130 relates. It is contemplated that less than half of known APs in the particular geographic region may be included in the sparse AP database 130. In some implementations, less than 1% of known APs in the particular geographic region may be included in the sparse AP database 130.

For example, it is contemplated that APs included in the sparse AP database 130 may be selected such that there is a desired separation between any two APs. For example, given the typical range of operation of a Wi-Fi AP it is presently contemplated that a separation distance of about 50-100 meters on average may be provided. Thus, for example, in urban areas, where APs may be tightly clustered (in, for example, apartment buildings or office towers) most of such APs may be omitted from the sparse AP database 130.

Referring still to FIG. 1, electronic device 100 also includes location-based content database 140, which may be communicatively coupled with processor 110. The location-based content database 140 may include location-based information that may be preloaded onto the electronic device 100 by the manufacturer or distributor of the electronic device 100. In some implementations, some or all of the location-based content database 140 may be updated from time to time when the electronic device 100 is connected to the Internet.

Some parts of the location-based content database 140 may relate to advertising content that may be output to the user, upon request or at predetermined times and locations for example. Other parts of the location-based content database 140 may include location-based information that is not related to advertising. For example, parts of the location-based content database 140 may include educational information related to the history or geography of particular points of interest. As a further example, parts of the location-based content database 140 may include tourist information or information related to available government services relevant to a particular geographic location.

The processor 110 may be configured to control the Wi-Fi radio 120. For example, under control of the processor 110, the Wi-Fi radio 120 may scan so as to detect one or more Wi-Fi AP's that are within range of ("proximate to") the electronic device. It will be appreciated that a Wi-Fi AP may ordinarily "broadcast", over a range of up to about 50 m radius, identifying information regarding the Wi-Fi AP. For example, the Wi-Fi AP may broadcast its SSID and MAC address, and/or other identifying information. As a result, the processor 110 may be configured to receive identifying information for the one or more Wi-Fi AP's that are detected by the Wi-Fi radio 120.

In some implementations, the processor 110 may use received identifying information of the one or more Wi-Fi APs that are detected by the Wi-Fi radio 120 in order to make a coarse determination of a location of the electronic device. It will be appreciated that the term "coarse", as used herein and in the claims, to describe the presently described location determination, means that the determination may be based on a location of a single Wi-Fi access point that is both within range of the electronic device and listed in the sparse AP database 130. As such, the location determination is relatively coarse compared to conventional techniques based on GPS, cell phone tower triangulation, and/or conventional Wi-Fi positioning techniques, which triangulate between at least two signal sources. The processor 110 may be configured to make a coarse determination of the location of the electronic device by comparing the identification of the one or more detected Wi-Fi APs with the identifying information in the sparse AP database 130. The processor 110 may further be configured to select relevant information from the location-based content database 140 and output the selected information to the user of the electronic device 100 by way of the user I/O 150.

Figure 2:
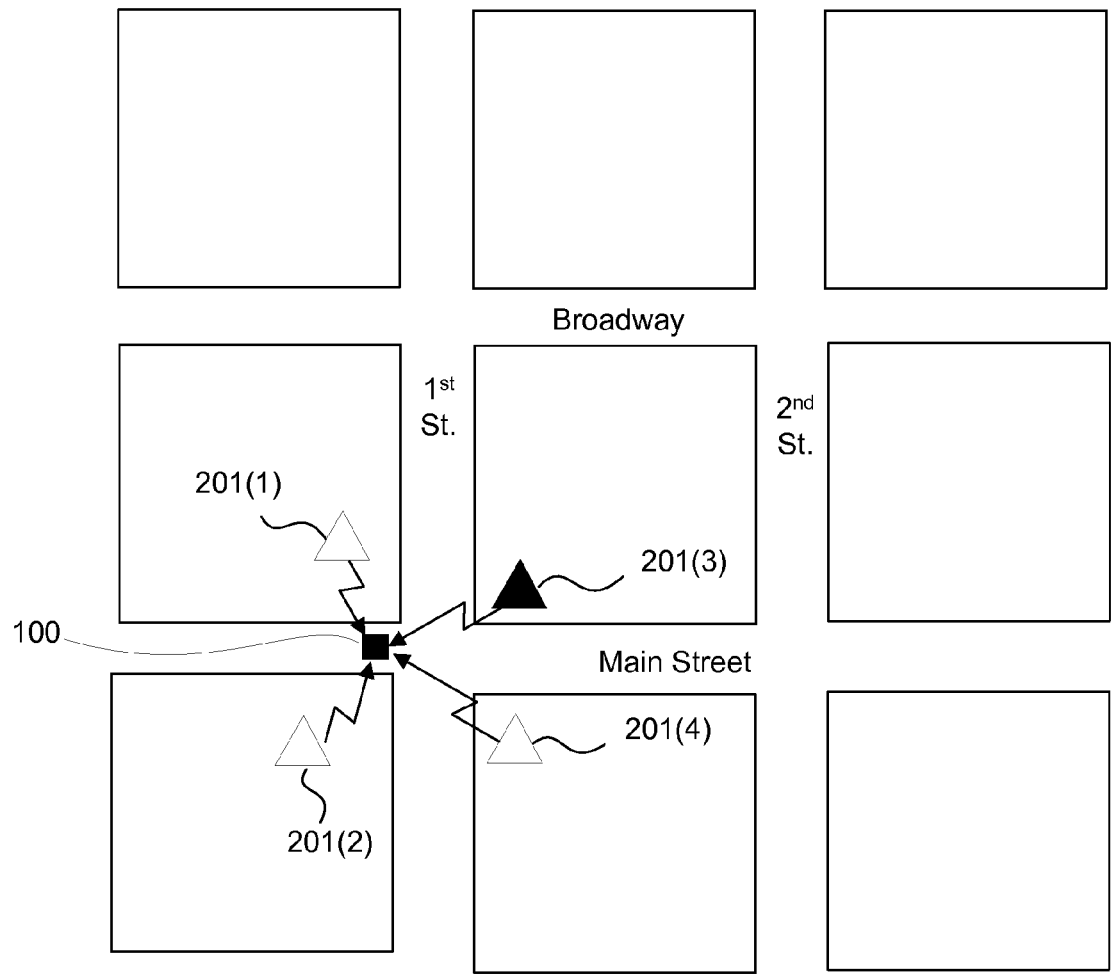
FIG. 2 is a simplified block diagram of the electronic device operating within range of a number of Wi-Fi access points.

FIG. 2 illustrates an example use case scenario where electronic device 100 is operating within range of a number of Wi-Fi AP's 201(i) in an urban environment. The electronic device 100 may receive information broadcast by any number of Wi-Fi APs 201(i). In the illustrated example, the Wi-Fi radio 120 is within the range of Wi-Fi APs 201(1), 201(2), 201(3), and 201(4). It will be appreciated that the electronic device 100 may be within the range of a greater or smaller number of Wi-Fi AP's. In the illustrated example, the Wi-Fi radio 120 may receive identifying information from Wi-Fi APs 201(1), 201(2), 201(3), and 201(4).

Referring still to FIG. 2, in the illustrated example, only the Wi-Fi AP 201(3) is included in the sparse AP database 130. Accordingly, in the illustrated example, the processor 110 may control the Wi-Fi radio 120 so as to detect each of Wi-Fi AP's 201(1), 201(2), 201(3), and 201(4), and make an identification of each Wi-Fi AP 201(i) based on the identifying information broadcast by the Wi-Fi AP 201(i) (e.g., the Wi-Fi AP 201(i)'s SSID and/or MAC address). In the illustrated example, when the identification of each Wi-Fi AP 201(i) is compared to information in the sparse AP database 130, only the Wi-Fi AP 201(3) will be recognized. Because the Wi-Fi AP 201(3) is included in the sparse AP database 130, the processor 110 may make a coarse determination of the location of the electronic device. More particularly, the processor 110 may be configured to look up, in the sparse AP database 130, the known location of the Wi-Fi AP 201(3) and make a determination from that location of the approximate location of the electronic device 100.

In some implementations, the processor 110 may be configured to calculate an approximate distance between the electronic device 100 and the Wi-Fi AP 201(3). For example, where it is known that the maximum range of the Wi-Fi AP 2013 is 50 m, the processor may be configured to make a coarse determination of a location of the electronic device 100 within a radius of 50 m from the known geo-coordinates of the Wi-Fi AP 201(3). In some implementations, an actually received signal strength from the Wi-Fi AP 201(3) may be compared to a reference value to determine that the electronic device 100 is within some particular radius less than 50 m from the known geo-coordinates of the Wi-Fi AP 201(3).

As illustrated in FIG. 2, the present disclosure contemplates determination of location based on received signals from Wi-Fi AP's 201, where, as few as only one of the Wi-Fi AP's 201 is identified in the sparse AP database 130. It will be appreciated, however, that where two or more Wi-Fi AP's 201 are identified in the sparse AP database 130 a more accurate determination of location may be made using triangulation techniques.

Referring now to FIG. 3, a process 300 for providing location-based content to a user of an electronic device is illustrated. Process 300 may begin at block 310, wherein one or more Wi-Fi AP's may be detected. As described above with reference to the implementation illustrated in FIG. 1, the Wi-Fi AP's may be detected by the Wi-Fi radio 120 under control of the processor 110, for example. The Wi-Fi AP's may be detected by scanning with the Wi-Fi radio 120. Where the Wi-Fi radio 120 is within range of one or more Wi-Fi AP's, identifying information of those Wi-Fi AP's, including SSID(s) and/or MAC address(es), for example, may be received.

As a result, identifying information of the detected Wi-Fi AP's may be obtained, at block 320. The identifying information may be used by the processor 110, which may access the sparse AP database 130 and make a comparison, at block 330, of the identifying information of detected Wi-Fi AP(s) with identification information stored in the sparse AP database 130. When the comparison results in a match being made between the identifying information of the detected Wi-Fi AP(s) and identification information stored in the sparse AP database 130, the location of the detected Wi-Fi AP(s) may also be determined from the sparse AP database 130.

Using the determined location, appropriate location-based content may be selected, block 340, from the locally stored location-based content database 140. The selected location-based content information may be outputted, bock 350, to the user of the electronic device 100 by, for example presenting the information on a display of the device. Thus location-based content may be provided on the electronic device 100, even though the electronic device 100 may not have connection with the Internet.

Figure 4:
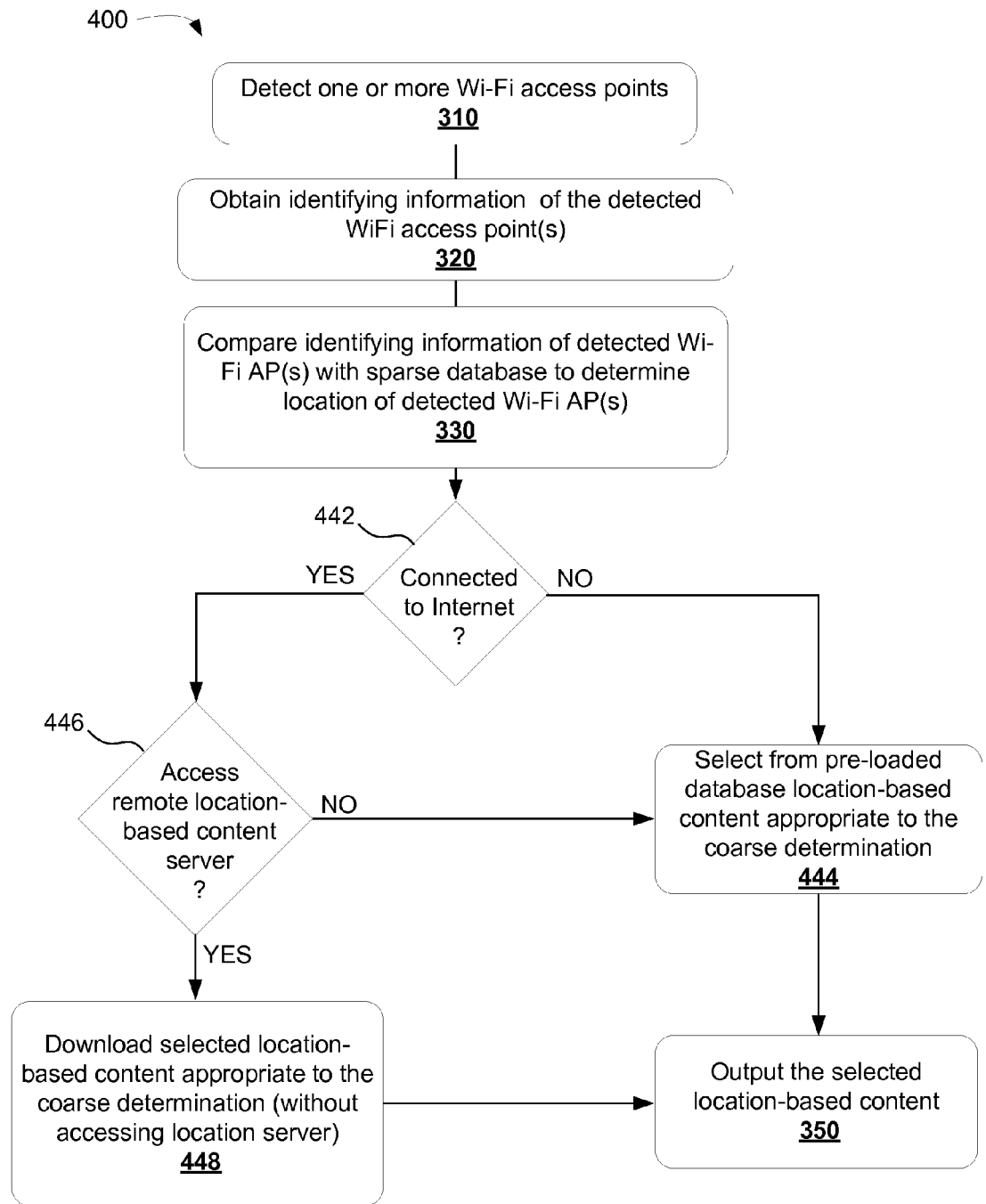
FIG. 4 is a simplified process flow diagram of a method for providing location based services and advertising to the user of the electronic device according to another implementation.

As an optional step, in some implementations, a determination of a location of the electronic device 100 relative to one or more of the detected Wi-Fi APs may be made, block 335. For example, where two or more detected Wi-APs are included in the in the sparse AP database 130, block 335 may include performing a triangulation calculation to obtain a determination of the location of the electronic device 100. In some implementations, referring now to FIG. 4, the process 300 described above may be modified so as to make a determination whether or not there is a connection with the Internet, and to tailor selection of the location-based content, accordingly. More specifically, in the illustrated implementation, process 400 includes blocks 310, 320, and 330 as described above in connection with process 300.

Following execution of block 330, however, in accordance with process 400, a determination may be made at block 442, whether or not there is a connection with the Internet. If the determination at block 442 is that electronic device 100 is not connected to the Internet, the process may enter block 444. At block 444, the location-based content may be selected from locally stored location-based content database 140.

If, on the other hand, the determination at block 442 is that electronic device 100 is connected to the Internet, the process 400 may enter block 446. At block 446, a determination may be made whether or not to access a remote location-based content server. If the determination is made not to access the remote location-based content server, the process may enter block 444. Otherwise selected location-based content, appropriate to the location determination made at block 330, may be downloaded over the Internet from the remote location-based content server, block 448.

It should be noted that block 448 may be executed without necessarily accessing any location server or other remote database of Wi-Fi AP locations. Instead, it is contemplated that, because the location determination has already been made, Internet access described at block 446 may be made only with the location-based content server controlling access to the selected location-based content. For example, having made a determination of the location of the electronic device, and having determined that the electronic device is connected to the Internet, the processor 110 may be configured to display local weather or traffic information relating to the determined location, for example. The processor 110 may obtain such real-time information directly from the location-based content server without a need to first access the location server. Instead, the processor 110 may immediately forward the determined location to the location-based content server controlling access to the local weather or traffic information. As a result, latency is reduced because the electronic device is not required to first query the location server before accessing the location-based content server controlling access to the local weather or traffic information. Moreover, at least some users may be gratified that the present techniques, in some implementations, avoid transmitting information regarding the user's exact whereabouts to a server, but instead only send location information of an AP that may be some distance from the user. As a result, a greater degree of user privacy may be afforded.

Figure 5:
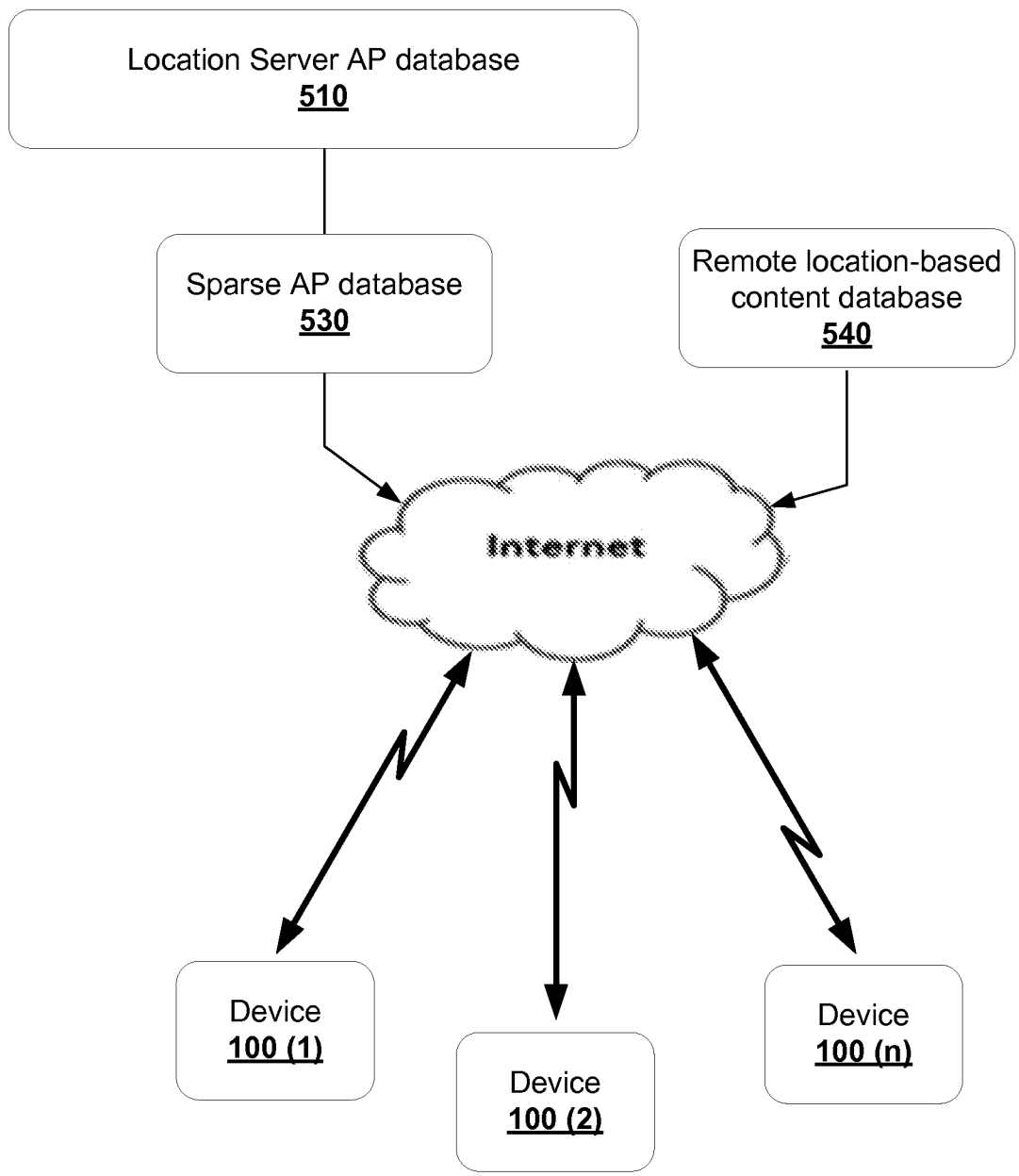
FIG. 5 is a simplified block diagram of the electronic device communicatively coupled with the Internet.

As indicated above, the electronic device 100 may, at least from time to time, be connected with the Internet connection. Referring now to FIG. 5, when the electronic device 100 is communicatively coupled with the Internet, the electronic device 100 may update the sparse AP database 130 and/or the location-based content database 140 by way of an Internet connection. For example, a sparse AP database 530 may be remotely stored and maintained by, for example, a manufacturer or distributor of the electronic device 100, or a third party. Remotely stored sparse database 530 may be communicatively coupled from time to time with location server database 510, at which times content of the remotely stored sparse database 530. The remotely stored sparse database 530 may include a subset of the AP information maintained by the location server database 510. In some implementations, it is contemplated that the remotely stored sparse database 530 one including subset of APs within a multinational geographic region encompassing as much as the entire world. In some implementations, the sparse AP database 130 may include a portion of the remotely stored sparse database 530, relates, for example, only to a smaller geographic region such as a single country or state. In other implementations, the sparse AP database 130 may include all or a large portion of the remotely stored sparse database 530.

Referring still to FIG. 5, when the electronic device 100 is connected to the Internet, location-based content database 140 may also be updated. For example, a location-based content database 540 may be remotely stored and maintained by, for example, a manufacturer or distributor of the electronic device 100, or a third party. Updates to the location-based content database 140 may be made automatically or upon a user request from content remotely stored in the location-based content database 540.

Figure 6A:
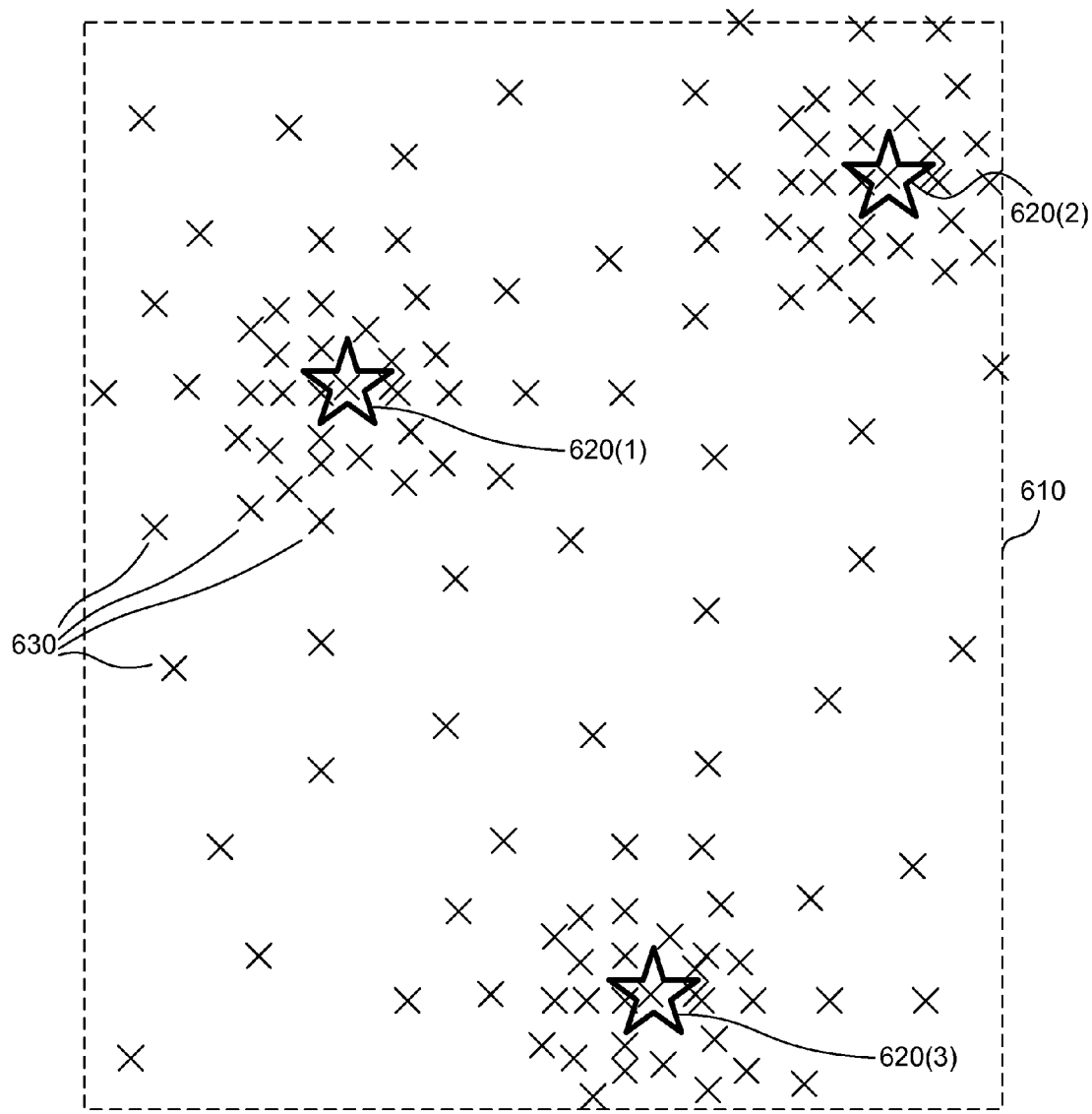
FIGS. 6A, 6B, and 6C illustrate an example of a technique for developing a sparse subset of access points.
Figure 6B:
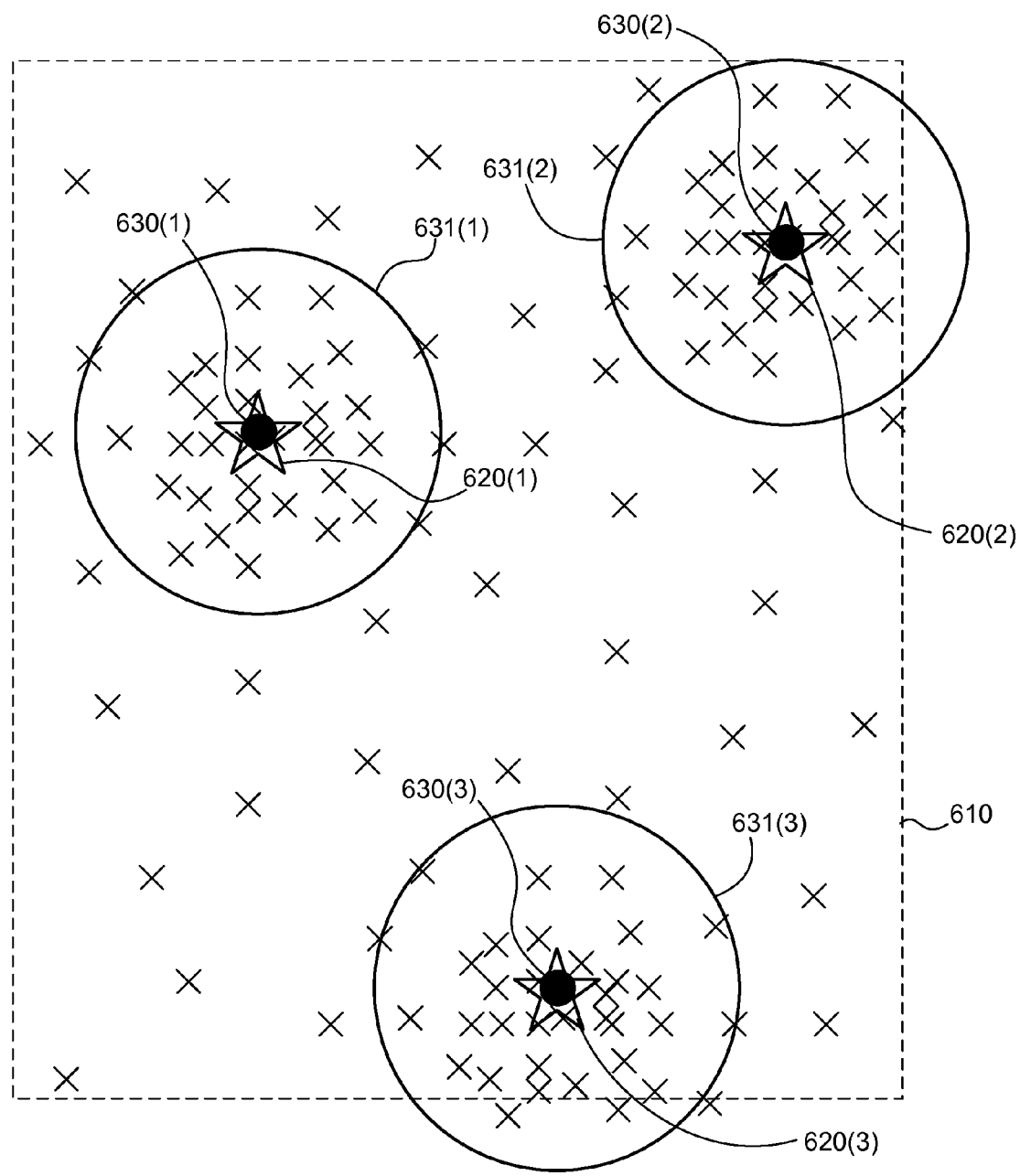
Figure 6C:
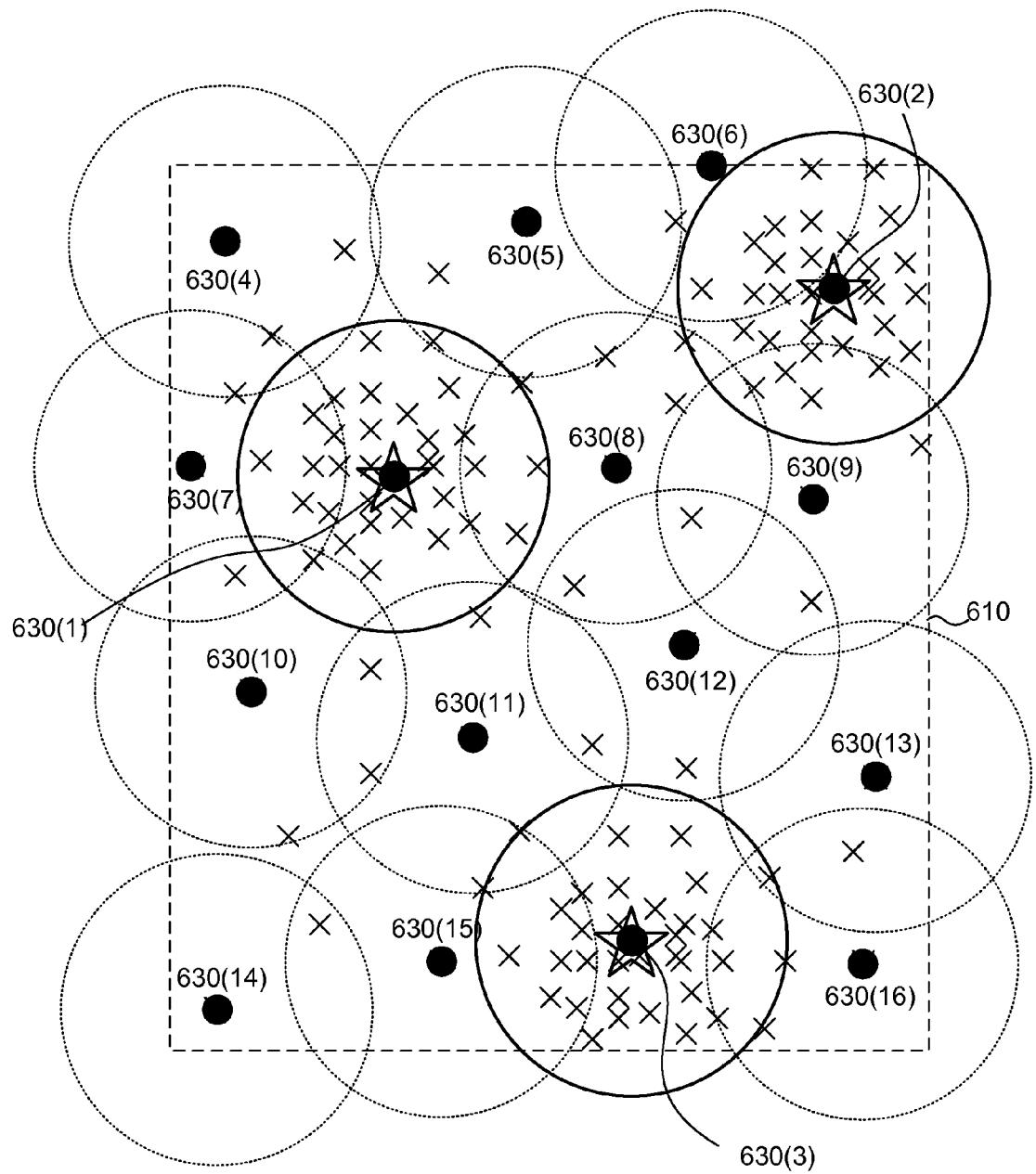

FIGS. 6A, 6B and 6C illustrate an example of developing a sparse subset of APs. Referring first to FIG. 6A, a view of a simplified geographic region 610 is illustrated. Within geographic region 610, three starting points 620 have been identified. Starting points 620 are any locations that may be used to initialize determination of a sparse database. For example, starting points 620 may include PoI's, locations with a large number of APs, locations with a high population density, or locations where a large number of mobile devices are present. The geographic region 610 may also include numerous AP's 630. In the illustrated example, there are more than one hundred AP's. It may be observed that there is a higher density of APs 630 proximate to each starting point 620.

As indicated above, it is contemplated that creation of the sparse subset of APs may begin by selecting a first group of AP's that are near to, or approximately co-located with, a starting point. Accordingly, referring now to FIG. 6B, the sparse subset may be initially populated by a first group of three AP's, AP 630(1), AP 630(2), and AP 630(3), where each AP 630(i) in the first group is located proximate to a respective starting point 620(i). It will be appreciated that each AP has an effective range within which an electronic device may receive a usable signal. The useful range will vary substantially from AP to AP, and depends for example, on the frequency band in which the AP operates, whether the AP is indoors or outdoors, and, if indoors, the nature of the construction of the building in which it is located. For purposes of the present simplified example, it is assumed that each Wi-Fi AP has a similar useful range of approximately 50 meter radius, as illustrated by outer circles 631(i) surrounding each of AP's 630(1), AP 630(2), and AP 630(3).

Referring now to FIG. 6C, the sparse subset may next be populated by selecting a second group of AP's such that, for each AP in the first group and the second group, a separation distance between the access point and an adjacent (nearest neighboring) access point is approximately 50 to 100 meter. Identifying information and location information for each AP in the resulting sparse subset of AP's, that includes a relatively small subset of a global catalog of known AP's, may be incorporated into AP database 130 at the time of manufacturing or sale of the electronic device 100, or subsequently. The AP database 130 may also be updated from time to time, either automatically or in response to a user request. As a result of the above-described techniques, in the illustrated example, an electronic device 100 located almost anywhere within geographic region 610 will be able to detect a signal from at least one AP 630 for which identifying information and location information is included in the sparse subset, notwithstanding that less than 20% of the total number of AP's are included in the sparse subset. Consequently, the electronic device may be enabled to make a coarse determination of its location, using the techniques described above, using a reasonably sized, locally stored, AP database 130.

For clarity of illustration, FIGS. 6A, 6B, and 6C, relate to a relatively small geographic area (less than 400 m×400 m), including only three starting points and fewer than 150 AP's. It will be appreciated that real use-case scenarios contemplate much larger geographic areas. For example, AP database 130 may include identifying information and location information for a sparse set of APs distributed across a geographic region equivalent to a metropolitan area, a county, a state or multi-state region, country or the entire world. Thus, the size of the geographic region contemplated by the present disclosure may be in the range of a few tens of square miles to tens of millions of square miles.

Other techniques may be used for developing a sparse subset of APs. More generally, the sparse subset of APs may be determined by selecting APs from a list to satisfy various criteria, such as to (i) maximize a geographic area over which an electronic device is able to detect at least one AP, (ii) maximize a number of devices that are able to detect at least one AP, (iii) maximize a number of people that able to detect at least one AP, or (iv) minimize a number of APs that an electronic device can detect at any particular location. In some embodiments, only one criterion may apply or multiple criteria may apply. In terms of maximizing or minimizing any criterion, a local maximum or minimum may be determined and a global maximum or minimum is not necessary. The number of access points selected for the sparse subset may be determined according to various threshold coverages. For example, the number of access points in the sparse subset may be determined to reach threshold coverage of geographic areas (e.g., 90% of the geographic area covered by the full AP database), a threshold population coverage (e.g., 90% of the population are able to access at least one AP in the sparse subset), or a threshold mobile device coverage (e.g., 90% of mobile devices are able to access at least one AP in the sparse subset).

For example a greedy algorithm may be used where we select a first AP that best matches a criterion (e.g., population density, number of APs, etc.). After the first AP is selected, a second AP is selected that best meets the criteria after the selection of the first AP and so forth. The selection process may terminate based on reaching a specified number of APs or meeting a coverage criteria. Other techniques may be used as well. For example, an objective function may be determined (e.g., relating to coverage criteria) and APs may be selected to maximize the objective function. Techniques known to one of skill in the art may be used to maximize the objective function, such as gradient descent, the expectation maximization algorithm, dynamic programming, or a simulated annealing algorithm.

Figure 7:
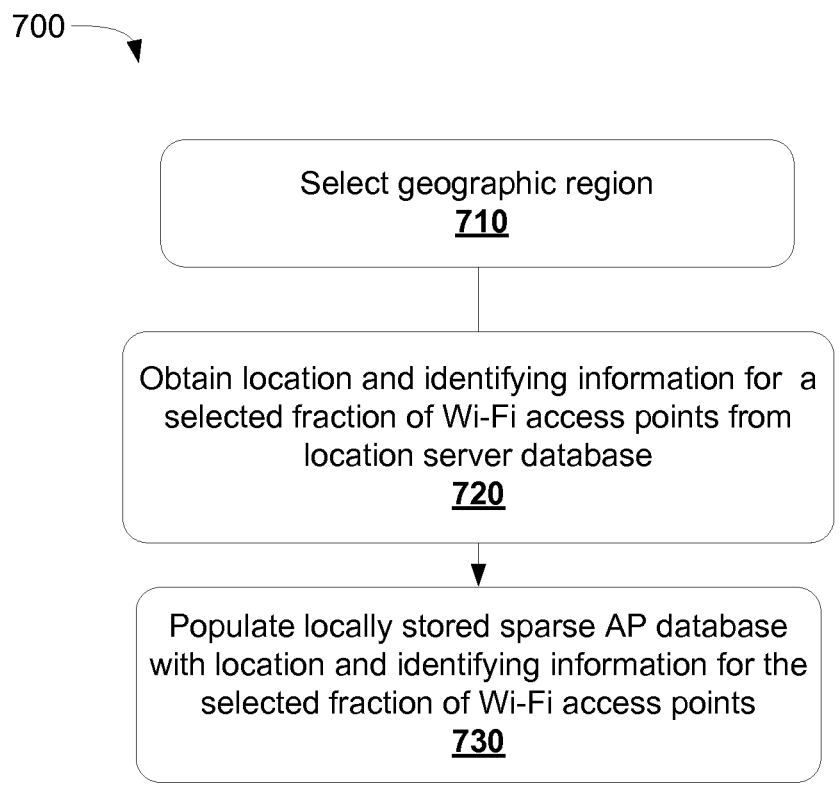
FIG. 7 is a simplified process flow diagram of a method for populating a locally stored sparse AP database.

Referring to FIG. 7, a process for populating a locally stored sparse AP database will be described. Process 700 may begin by selecting a geographic region of interest, block 710. The geographic region may correspond to a metropolitan area, a county, state, country or continent, for example. The geographic region may include a large number of Wi-Fi access points, for which identifying information and location information is maintained by one or more location server databases. Location server databases of a type contemplated for use with the present techniques have been developed or proposed by Google, Skyhook Wireless, and Navizon, for example. In at least portions of the geographic region (e.g., urban and suburban areas) the Wi-Fi access points are sufficiently densely distributed that the location server database is able to allow a client electronic device, accessing the location server database, to obtain location information and provide location-based services within those areas.

At block 720, location and identifying information for a selected fraction of Wi-Fi APs from the location server database may be obtained. It is contemplated that the selected fraction may constitute less than half of the APs included in a location server database. In some implementations, the selected fraction may constitute less than 1% of the APs included in the location server database. In some implementations, the selected fraction of Wi-Fi APs may be selected so as to ensure that, in aggregate, they enable an electronic device that is not connected to the location server to provide location based services in approximately the same portions of the geographic region where the location server database is able to allow a client electronic device to obtain location information.

The selected fraction may be chosen, in some implementations, using the techniques described above in connection with FIG. 6. Alternatively or in addition, a number of other techniques may be contemplated. In some implementations, for example, at least some of the selected fraction of Wi-Fi APs may be selected as a result of being in a densely populated area or proximate to a transportation corridor, irrespective of locations of identified points of interest. In some implementations, at least some of the selected fraction of Wi-Fi APs may be selected as part of a contiguous array. In some implementations, at least some of the selected fraction of Wi-Fi APs are selected so as to preferentially include Wi-Fi APs that are proximate to population centers and/or to transportation corridors connecting population centers within the geographic region.

Referring still to FIG. 7 a locally stored sparse AP database may be populated with location and identifying information for the selected fraction of Wi-Fi access points. The locally stored sparse AP database may be or include the sparse AP database 130 described above in connection with FIG. 1.

Figure 8:
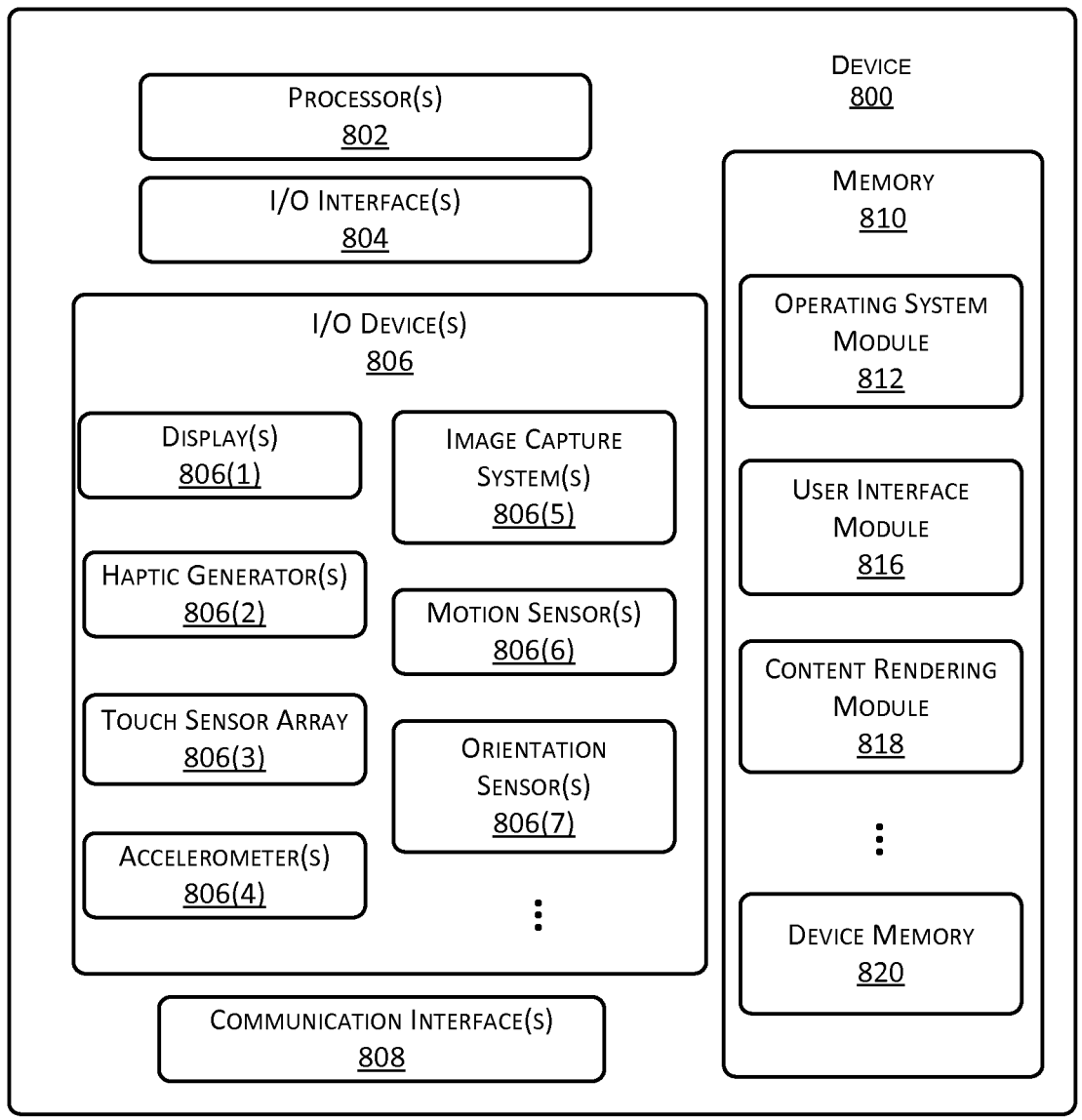
FIG. 8 illustrates a block diagram of an example of an electronic device with which the presently disclosed techniques may be employed.

FIG. 8 illustrates a block diagram of an example of an electronic device with which the presently disclosed techniques may be employed. Device 800 includes one or more single or multi-core processors 802 configured to execute stored instructions (e.g., in device memory 820). Device 800 may also include one or more input/output (I/O) interface(s) 804 to allow the device to communicate with other devices. I/O interfaces 804 may include, for example, an inter-integrated circuit (I2C) interface, a serial peripheral interface (SPI) bus, a universal serial bus (USB), an RS-232 interface, a media device interface, and so forth. I/O interface(s) 804 is coupled to one or more I/O devices 806. The I/O device(s) 806 may include one or more displays 806(1), one or more haptic generators 806(2), a touch sensor array 806(3), one or more accelerometers 806(4), one or more image capture systems 806(5), one or more motion sensors 806(6), one or more orientation sensors 806(7), microphones, speakers, and so forth. The one or more displays 806(1) are configured to provide visual output to the user and may comprise any of a variety of display types including, for example, any type of reflective or transmissive display. Touch sensor array 806(3) may be a capacitive sensor array having a matrix of conductors that are scanned to determine, for example, the location, duration, speed and direction of touch events within the matrix based on changes in electrical capacitance.

Device 800 may also include one or more communication interfaces 808 configured to provide communications between the device and other devices. Such communication interface(s) 808 may be used to connect to cellular networks, personal area networks (PANs), local area networks (LANs), wide area networks (WANs), and so forth. For example, communications interfaces 808 may include radio frequency modules for a 3G or 4G cellular network, a Wi-Fi LAN and a Bluetooth PAN. Device 800 also includes one or more buses or other internal communications hardware or software that allow for the transfer of data and instructions between the various modules and components of the device.

Device 800 may also include one or more memories (e.g., memory 810). Memory 810 may include non-transitory computer-readable storage media that may be any of a wide variety of types of volatile and non-volatile storage media including, for example, electronic storage media, magnetic storage media, optical storage media, quantum storage media, mechanical storage media, and so forth. Memory 810 provides storage for computer readable instructions, data structures, program modules and other data for the operation of device 800. Memory 810 may include at least one operating system (OS) module 812 configured to manage hardware resources such as I/O interfaces 804 and provide various services to applications or modules executing on processor(s) 802. Memory 810 may also include a user interface module 816, a content rendering module 818, and other modules.

User interface module 816 is configured to present a user interface to the user that may include visual, audible, and/or haptic components. For example, user interface module 816 may be configured to present, in conjunction with content rendering module 818, an image on display 806(1). User interface module 816 may also be configured to process inputs of applied forces (e.g., touch events, swipes, etc.) at particular locations on the display to take particular actions such as, for example, paging forward or backward through paged content, zooming in and out, panning, etc.

Memory 810 may also include device memory 820 to store a wide variety of instructions and information using any of a variety of formats including, for example, flat files, databases, linked lists, trees, or other data structures. In some implementations, a portion of device memory 820 may be distributed across one or more other devices including servers, network attached storage devices, and so forth.

The presently disclosed techniques may include computer program instructions to adaptively manage power draw from the battery of the peripheral device based on a real-time situational awareness may be implemented in a variety of ways. For example, they could be part of the native display controller logic of device 800. Alternatively, they could be implemented as a separate application that may be downloaded to the device. In another alternative, where device 800 is a thin client, at least some of the instructions may be hosted on a remote platform. It will also be understood that device 800 of FIG. 8 is merely an example of a device with which various implementations of the present invention may be practiced, and that a wide variety of other devices types may also be used. The scope of the invention should therefore not be limited by reference to device-specific details discussed above.

Thus, techniques enabling location-based content to be available on a mobile electronic device even in the absence of an active Internet connection have been described. Examples of some of these implementations are illustrated in the accompanying drawings, and specific details are set forth in order to provide a thorough understanding thereof. It should be noted that implementations may be practiced without some of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method comprising:
   identifying, by a computing system, a plurality of Wi-Fi access points;
   selecting, by the computing system, a first group of one or more of the plurality of Wi-Fi access points, each of the one or more of the plurality of Wi-Fi access points of the first group selected based on being identified as being within a region of Wi-Fi access points having a density of Wi-Fi access points within a density range corresponding to an initial selection of Wi-Fi access points;
   selecting, by the computing system, a second group of one or more of the plurality of Wi-Fi access points, each of the one or more of the plurality of Wi-Fi access points of the second group selected based on being identified as being outside a distance range from each of the one of the one or more of the plurality of Wi-Fi access points of the first group and the second group identified as being within a region having a lower density of Wi-Fi access points than the region of the first group, wherein a number of Wi-Fi access points selected in the first group and the second group is based on meeting or exceeding a threshold coverage range of Wi-Fi access points within the regions associated with the first and second groups of the Wi-Fi access points;
   wherein selection of the first group and the second group of the Wi-Fi access points results in (i) an increase in a geographic area over which the electronic device detects at least one Wi-Fi access point in a sparse subset of access points corresponding to the first group and the second group, and (ii) a reduction in a number of Wi-Fi access points in the sparse subset of access points the electronic device can detect at any particular location; and
   providing, by the computing system, the first group and the second group of the plurality of Wi-Fi access points to the electronic device, wherein a first Wi-Fi access point included in the first group or the second group of the plurality of Wi-Fi access points corresponds to a location of a Wi-Fi access point detected by the electronic device.

2. The method of claim 1, wherein the number of Wi-Fi access points in the first group and the second group is fewer than the plurality of Wi-Fi access points.

3. The method of claim 1, wherein the first group corresponds to points of interest associated with a higher usage of devices using the Wi-Fi access points than the second group.

4. The method of claim 1, wherein the first group of the Wi-Fi access points were selected using one or more of a greedy algorithm, a simulated annealing algorithm, maximizing an objective function, or selecting a plurality of places of interest as starting points corresponding to the initial selection.

5. The method of claim 1, wherein the Wi-Fi access points are selected so as to provide a contiguous coverage of a geographic region including the first group and the second group.

6. A system comprising:
   one or more processors and memory configured to:
   identify a plurality of Wi-Fi access points;
   select a first group of one or more of the plurality of Wi-Fi access points, each of the one or more of the plurality of Wi-Fi access points of the first group selected based on being identified as being within a region of Wi-Fi access points having a density of Wi-Fi access points within a density range corresponding to an initial selection of Wi-Fi access points;
   select a second group of one or more of the plurality of Wi-Fi access points, each of the one or more of the plurality of Wi-Fi access points of the second group selected based on being identified as being outside a distance range from each of the one of the one or more of the plurality of Wi-Fi access points of the first group and the second group identified as being within a region having a lower density of Wi-Fi access points than the region of the first group, wherein a number of Wi-Fi access points selected in the first group and the second group is based on meeting or exceeding a threshold coverage range of Wi-Fi access points within the regions associated with the first and second groups of the Wi-Fi access points;
   wherein selection of the first group and the second group of the Wi-Fi access points results in (i) an increase in a geographic area over which the electronic device detects at least one Wi-Fi access point in a sparse subset of access points corresponding to the first group and the second group, and (ii) a reduction in a number of Wi-Fi access points in the sparse subset of access points the electronic device can detect at any particular location; and
   provide the first group and the second group of the plurality of Wi-Fi access points to an electronic device, the first group and the second group of the plurality of Wi-Fi access points corresponding to a location of a detected Wi-Fi access point by the electronic device.

7. The system of claim 6, wherein the number of Wi-Fi access points in the first group and the second group is fewer than the plurality of Wi-Fi access points.

8. The system of claim 6, wherein the first group corresponds to points of interest associated with a higher usage of devices using the Wi-Fi access points than the second group.

9. The system of claim 6, wherein the first group of the Wi-Fi access points were selected using one or more of a greedy algorithm, a simulated annealing algorithm, maximizing an objective function, or selecting a plurality of places of interest as starting points corresponding to the initial selection.

10. The system of claim 6, wherein the Wi-Fi access points are selected so as to provide a contiguous coverage of a geographic region including the first group and the second group.

11. A computer program product comprising one or more non-transitory computer-readable media having computer instructions stored therein, the computer program instructions being configured such that, when executed by one or more computing devices, the computer program instructions cause the one or more computing devices to:
identify a plurality of Wi-Fi access points;
select a first group of one or more of the plurality of Wi-Fi access points, each of the one or more of the plurality of Wi-Fi access points of the first group selected based on being identified as being within a region of Wi-Fi access points having a density of Wi-Fi access points within a density range corresponding to an initial selection of Wi-Fi access points;
select a second group of one or more of the plurality of Wi-Fi access points, each of the one or more of the plurality of Wi-Fi access points of the second group selected based on being identified as being outside a distance range from each of the one of the one or more of the plurality of Wi-Fi access points of the first group and the second group identified as being within a region having a lower density of Wi-Fi access points than the region of the first group, wherein a number of Wi-Fi access points selected in the first group and the second group is based on meeting or exceeding a threshold coverage range of Wi-Fi access points within the regions associated with the first and second groups of the Wi-Fi access points;
wherein selection of the first group and the second group of the Wi-Fi access points results in (i) an increase in a geographic area over which the electronic device detects at least one Wi-Fi access point in a sparse subset of access points corresponding to the first group and the second group, and (ii) a reduction in a number of Wi-Fi access points in the sparse subset of access points the electronic device can detect at any particular location; and
provide the first group and the second group of the plurality of Wi-Fi access points to an electronic device, the first group and the second group of the plurality of Wi-Fi access points corresponding to a location of a detected Wi-Fi access point by the electronic device.

12. The computer program product of claim 11, wherein the number of Wi-Fi access points in the first group and the second group is fewer than the plurality of Wi-Fi access points.

13. The computer program product of claim 11, wherein the first group corresponds to points of interest associated with a higher usage of devices using the Wi-Fi access points than the second group.

14. The computer program product of claim 11, wherein the first group of the Wi-Fi access points were selected using one or more of a greedy algorithm, a simulated annealing algorithm, maximizing an objective function, or selecting a plurality of places of interest as starting points corresponding to the initial selection.

15. The computer program product of claim 11, wherein the Wi-Fi access points are selected so as to provide a contiguous coverage of a geographic region including the first group and the second group.

* * * * *